US012628955B2

(12) United States Patent
Yang

(10) Patent No.: US 12,628,955 B2
(45) Date of Patent: May 19, 2026

(54) FOLDABLE FRAME

(71) Applicant: XIAMEN UNIPROS CAMPING PRODUCTS COMPANY LIMITED, Xiamen (CN)

(72) Inventor: Yonggeng Yang, Xiamen (CN)

(73) Assignee: XIAMEN UNIPROS CAMPING PRODUCTS COMPANY LIMITED, Xiamen (CN)

( * ) Notice: Subject to any disclaimer, the term of this patent is extended or adjusted under 35 U.S.C. 154(b) by 9 days.

(21) Appl. No.: 18/950,894

(22) Filed: Nov. 18, 2024

(65) Prior Publication Data

US 2026/0047682 A1 Feb. 19, 2026

(30) Foreign Application Priority Data

Aug. 16, 2024 (CN) .......................... 202421990261.8
Sep. 11, 2024 (CN) .......................... 202422226076.8

(51) Int. Cl.
| | |
|---|---|
| *A47C 4/28* | (2006.01) |
| *A45F 3/24* | (2006.01) |
| *A47B 3/00* | (2006.01) |
| *A47C 3/025* | (2006.01) |
| *A47C 7/66* | (2006.01) |
| *A47C 19/12* | (2006.01) |
| *B62B 3/02* | (2006.01) |

(52) U.S. Cl.
CPC ............ *A47C 4/286* (2013.01); *A47C 3/0255* (2013.01); *A47C 7/66* (2013.01); *A45F 3/24* (2013.01); *A47B 3/002* (2013.01); *A47C 19/126* (2013.01); *B62B 3/02* (2013.01)

(58) Field of Classification Search
CPC ..... A47C 4/286; A47C 3/0255; A47C 19/126; A45F 3/24; A47B 3/002; B62B 3/02
USPC .......................................................... 248/127
See application file for complete search history.

(56) References Cited

U.S. PATENT DOCUMENTS

| | | | | |
|---|---|---|---|---|
| 8,272,684 | B2 * | 9/2012 | Obolewicz ............. | A47C 4/286 |
| | | | | 297/16.2 |
| 11,370,467 | B1 * | 6/2022 | Horowitz ................ | B62B 3/007 |
| 11,737,564 | B2 * | 8/2023 | Chen ...................... | A47C 4/286 |
| | | | | 297/47 |
| 11,786,041 | B1 * | 10/2023 | Chen ........................ | A47C 4/42 |
| | | | | 297/16.1 |
| 11,871,848 | B1 * | 1/2024 | Wang ..................... | A47C 4/286 |
| 11,937,709 | B2 * | 3/2024 | Xu ........................... | A47B 3/12 |
| 11,986,099 | B2 * | 5/2024 | Garcia ..................... | A47C 4/28 |
| 12,185,843 | B2 * | 1/2025 | Yuan ....................... | A47C 4/286 |
| 2023/0172358 | A1 * | 6/2023 | Xu ........................... | A47C 9/105 |
| | | | | 297/16.2 |

* cited by examiner

*Primary Examiner* — Anita M King

(57) ABSTRACT

A foldable frame includes a first connection seat and at least three second connection seats which are arranged at intervals around the first connection seat. The first connection seat and the second connection seats are connected by first connection rods, and the second connection seats are provided with at least one second connection rod. The first connection seat has a first end surface, and the second connection seats each has a second end surface. When the foldable frame is in the extended state and the first end surface faces downward, the second end surface is lower than or is flush with the first end surface, and the free end of the second connection rod is configured to extend upward.

10 Claims, 15 Drawing Sheets

FOLDABLE FRAME

TECHNICAL FIELD

The present disclosure relates to the technical field of foldable frames of furniture, in particular to a foldable frame.

BACKGROUND

In the prior art, although foldable furniture such as foldable chairs, foldable beds, foldable tables, etc. have significantly optimized the efficiency of space utilization in design, their diverse foldable frame structures have become a pain point that cannot be ignored. The folding mechanism and assembly method are specific to different furniture which not only increases the training cost and time for workers on the production line, but also hinders the standardization and automation of the production process. Whenever a new foldable furniture product is introduced, the workers often need to go through a learning curve to re-master the new assembly skills, which not only reduces production efficiency, but also increases labor costs and management complexity. In addition, the diverse folding structures may also make the spare part inventory management more complicated, because different folding components are often difficult to use universally, thereby increasing inventory pressure and logistics costs. Therefore, there is an urgent need for a modular and standardized foldable frame.

SUMMARY

In view of the drawbacks in the prior art, the objective of the present disclosure is to provide a foldable frame to solve the problems mentioned in the background.

The present disclosure provides the following technical solutions.

A foldable frame being switchable between an extended state and a folded state, comprises a first connection seat and at least three second connection seats, wherein the second connection seats are arranged at intervals around the first connection seat, the first connection seat and the second connection seats are connected by first connection rods, and the second connection seats are provided with at least one second connection rod; the first connection seat has a first end surface, and each second connection seat has a second end surface; when the foldable frame is in the extended state and the first end surface faces downward, the second end surface is lower than or is flush with the first end surface, and a free end of the second connection rod is configured to extend upward.

Furthermore, two ends of each first connection rod are rotatably or pluggably connected to the first connection seat and one of the second connection seats respectively.

Furthermore, the first connection seat is provided with a first support surface and side plates spaced apart and arranged on two sides of the first support surface, the first connection rod is rotatably connected between the two side plates, and the first support surface is configured to support the first connection rod biased against the first support surface to put the first connection rod in an extended state.

Furthermore, an end of each second connection rod is pluggably or rotatably connected to one of the second connection seats.

Furthermore, each second connection seat is provided with a hole for inserting and connecting the second connection rods.

Furthermore, each second connection seat is connected with two second connection rods, and the two second connection rods are arranged in a V shape.

Furthermore, the two second connection rods each have a free end, and the free ends are two legs of the V shape.

Furthermore, the free ends of at least two second connection rods are each provided with a third connection rod.

According to another aspect, a foldable furniture comprises the foldable frame described in any one of the above items, and the foldable furniture is placed with the second end surfaces of the multiple second connection seats as support points.

According to yet another aspect, a foldable furniture comprises the foldable frame described in any one of the above items, and the foldable furniture is placed with the free ends of the multiple second connection rods as support points.

The present disclosure has the following advantages: a foldable frame being switchable between an extended state and a folded state includes a first connection seat and at least three second connection seats, the second connection seats are arranged at intervals around the first connection seat, the first connection seat and the second connection seat s are connected by first connection rods, and the second connection seats are provided with at least one second connection rod; the first connection seat has a first end surface, and the second connection seat has a second end surface; when the foldable frame is in an unfolded/extended state and the first end surface faces downward, the second end surface is lower than or is flush with the first end surface, and the free ends of the second connection rods are configured to extend upward. The design of the above foldable frame can not only unify the assembly process of different furniture products, reduce training for the workers, and improve production efficiency, but also can facilitate the sharing and interchangeability of spare parts and components, and reduce production costs. The foldable frame has few parts and a simple overall structure. The size of the foldable frame can be reduced by folding up the foldable frame which is convenient for logistics and transportation, suitable for various types of foldable furniture and can meet the diverse needs of customers, while providing consumers with more flexible and varied furniture configuration options.

Figure 1:
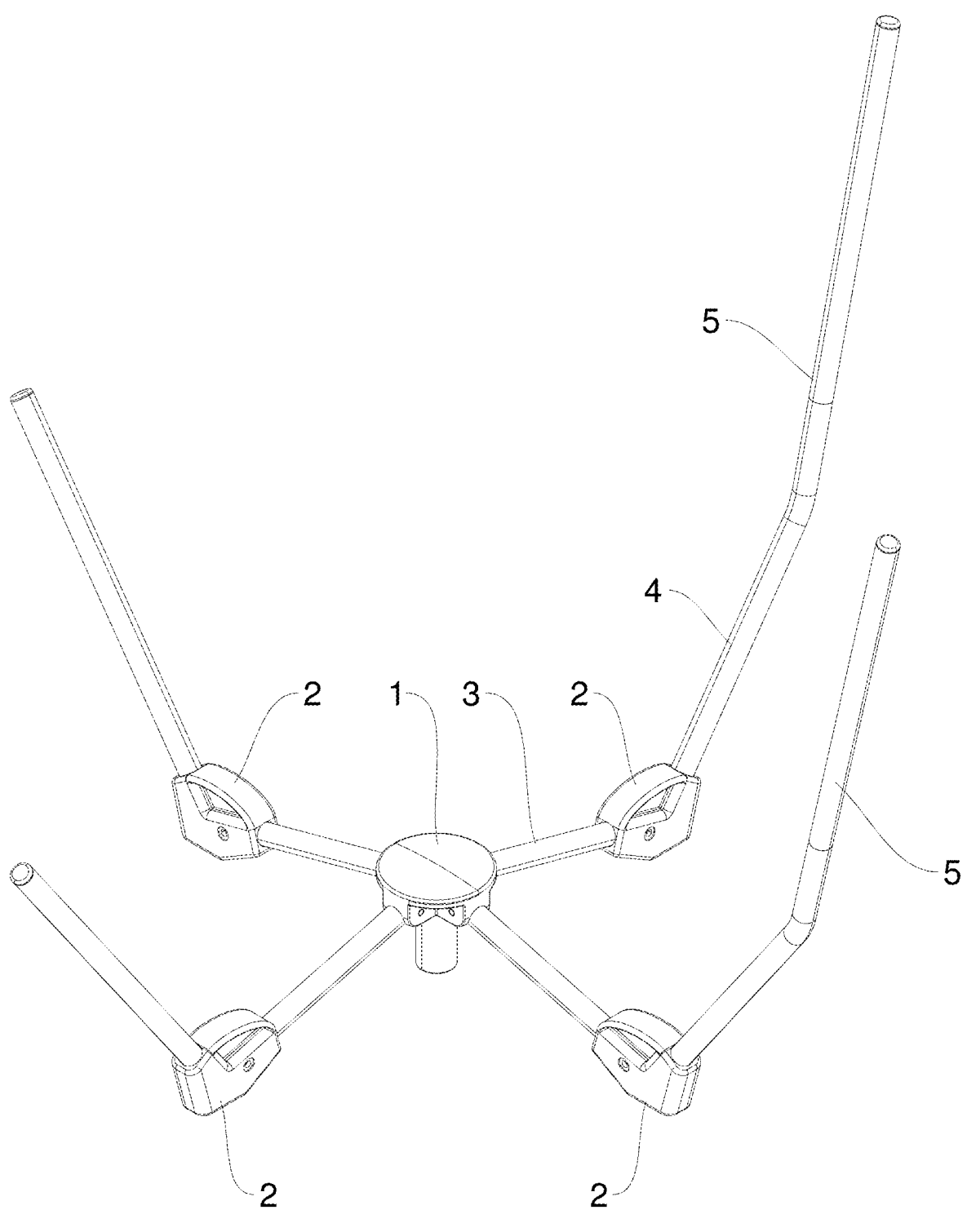
FIG. 1 is a perspective view of a foldable frame according to the first embodiment of the present disclosure.

The above drawings include the following reference numerals:

1. first connection seat; 11. first end surface; 12. first support surface; 13. side plate; 2. second connection seat; 21. second end surface; 22. first hole; 23. second hole; 24. reinforcing rib; 25. arc-shaped connection plate; 3. first connection rod; 31. adjustment hole; 4. second connection rod; 5. third connection rod; 6. elastic rope; 7. third connection seat; 71. third support surface; 72. side sheet; 73. extension portion; 74. rotation pin; 8. handle; 81. fourth connection rod; 82. wheel; 83. coupling connector; 84. fifth connection rod; 85. first locking pin; 86. snap fastener; 871. support plate; 872. U-shaped piece; 873. nut.

DETAILED DESCRIPTION OF THE EMBODIMENTS

In order to make the objectives, technical solutions and advantages of the embodiments of the present disclosure clearer, the technical solutions of the embodiments of the present disclosure will be clearly and completely described below in conjunction with the drawings for illustrating the embodiments of the present disclosure. It should be noted that the description of these embodiments is intended to facilitate understanding of the present disclosure rather than limit the present disclosure. In addition, the technical features involved in respective embodiment of the present disclosure described below can be combined randomly as long as they do not conflict with each other.

Referring to FIGS. 1-5, a foldable frame is shown, the foldable frame is switchable between an extended state and a folded state and includes a first connection seat 1 and at least three second connection seats 2. The number of the second connection seats 2 includes but is not limited to three, and preferably, the second connection seats 2 are arranged at equal spacing around the first connection seat 1, so that the foldable frame would undergo uniform stress.

The first connection seat 1 and the second connection seats 2 are connected by first connection rods 3, and at least one second connection rod 4 is connected to one of the second connection seats 2. An end of the second connection rod 4 is connected to the second connection seat 2, and the other end of the second connection rod 4 is a free end for connecting with other parts of the foldable furniture.

Figure 2:
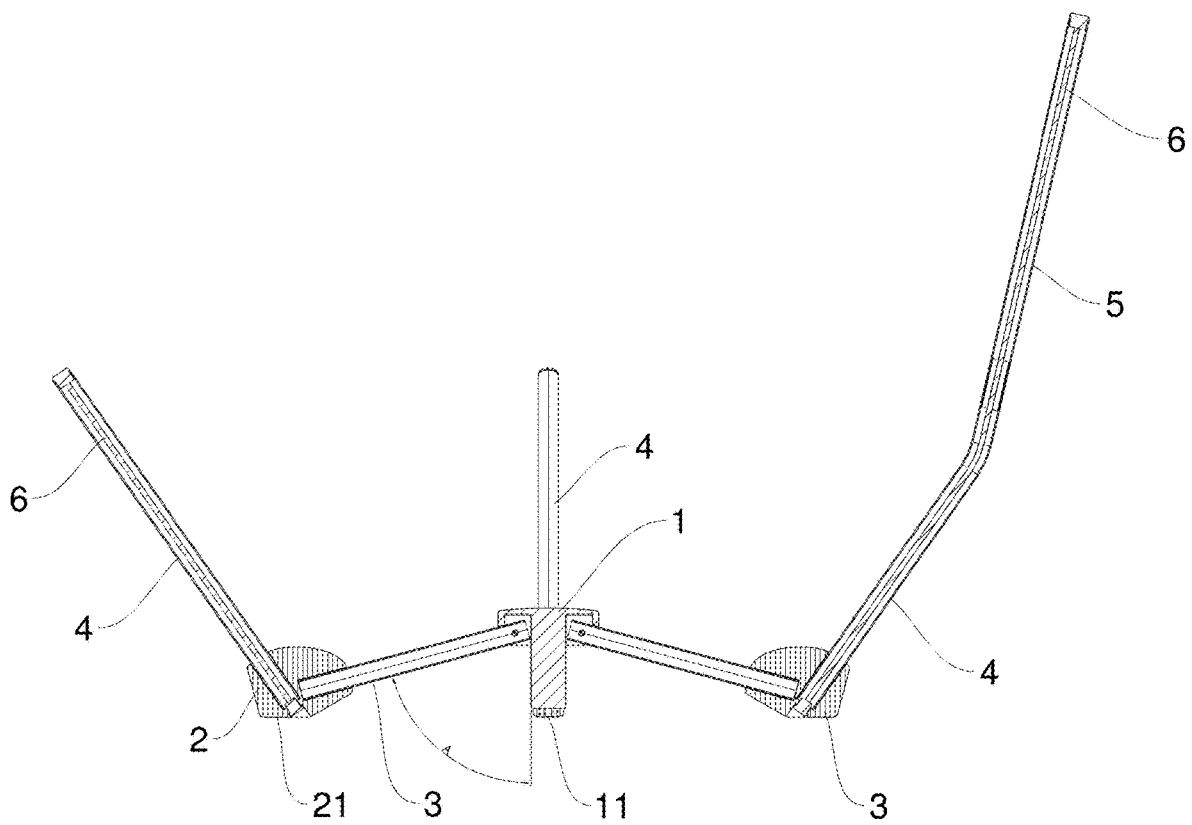
FIG. 2 is a cross sectional view of FIG. 1 cutting from the center.
Figure 3:
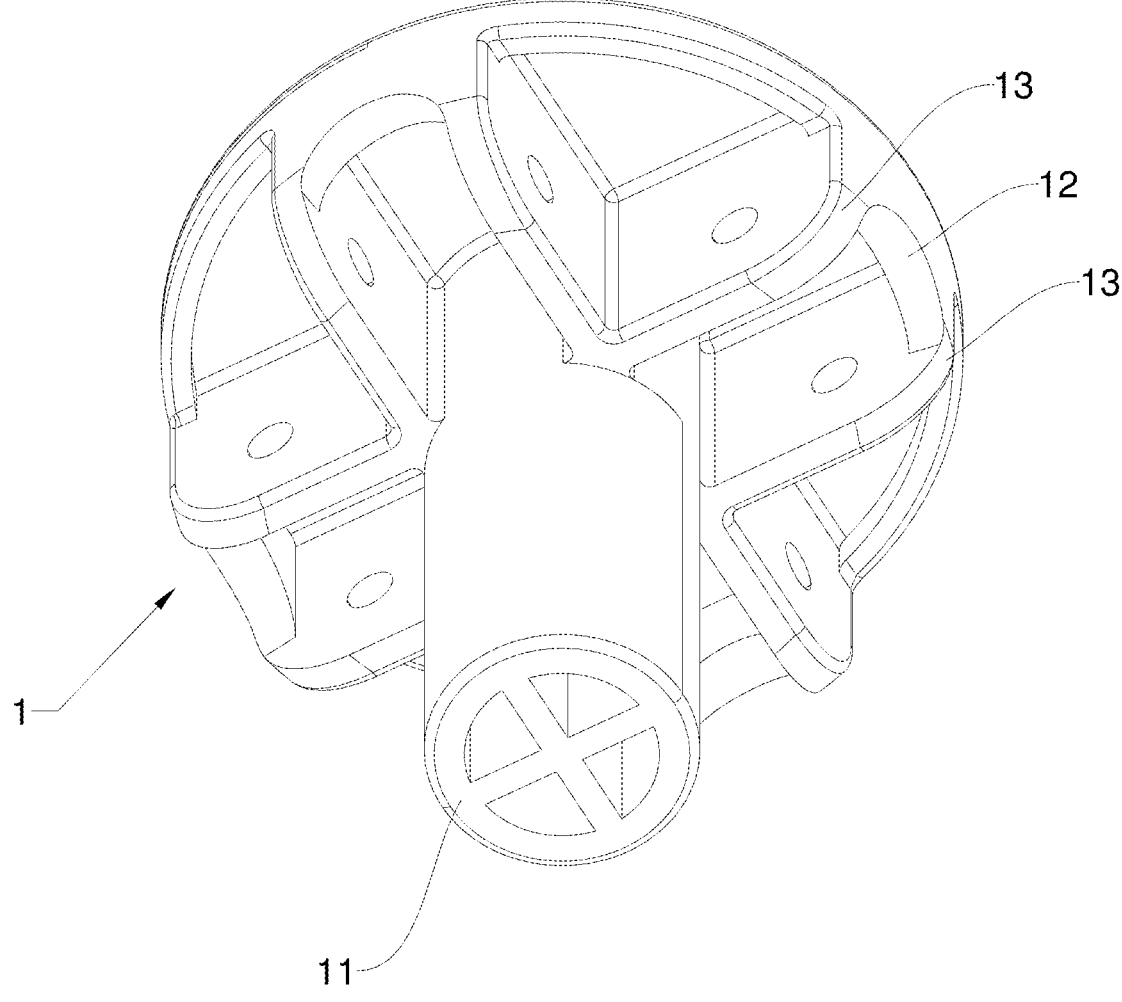
FIG. 3 is a perspective view of a first connection seat according to the first embodiment of the present disclosure.

The first connection seat 1 has a first end surface 11, and the second connection seat 2 has a second end surface 21. As shown in FIGS. 1 and 2, when the foldable frame is in the extended state and the first end surface 11 faces downward, the second end surface 21 is lower than or is flush with the first end surface 11, and the free end of the second connection rod 4 is configured to extend upward. The first end surface 11 and the second end surface 21 may be a flat surface or an arc surface. Preferably, the second end surface 21 is lower than the first end surface 11 and has a predetermined distance therebetween, the predetermined distance is greater than 0 cm and is smaller than or equal to 10 cm, so that when the foldable frame undergoes a downward pressure, the first connection rods 3 deform partly to make the first end surface 11 flush with the second end surface 21. Meanwhile, the first end surface 11 acts as the support and force bearing point, with the increasing of the support and force bearing points and the creation of the part deformation, the foldable frame, as a whole, is more stable in use.

When the foldable frame is applied in foldable furniture such as a foldable chair (including a foldable sunshade chair, a foldable reclining chair, a foldable swing chair, a foldable suspended cradle, etc.), a foldable bed (including a foldable hammock) or a foldable table, the edges and corners of a board (such as a wooden board, a plastic board, an iron board, etc.) or a cloth (such as a canvas, etc.) may be connected to the second connection rod 4 or the third connection rod 5. Referring to FIGS. 1 and 2, when in use, the foldable frame is placed with the first end surface 11 facing downward, and the above-mentioned foldable furniture is placed with the second end surface 21 of the second connection seat 2 as support point.

Figure 5:
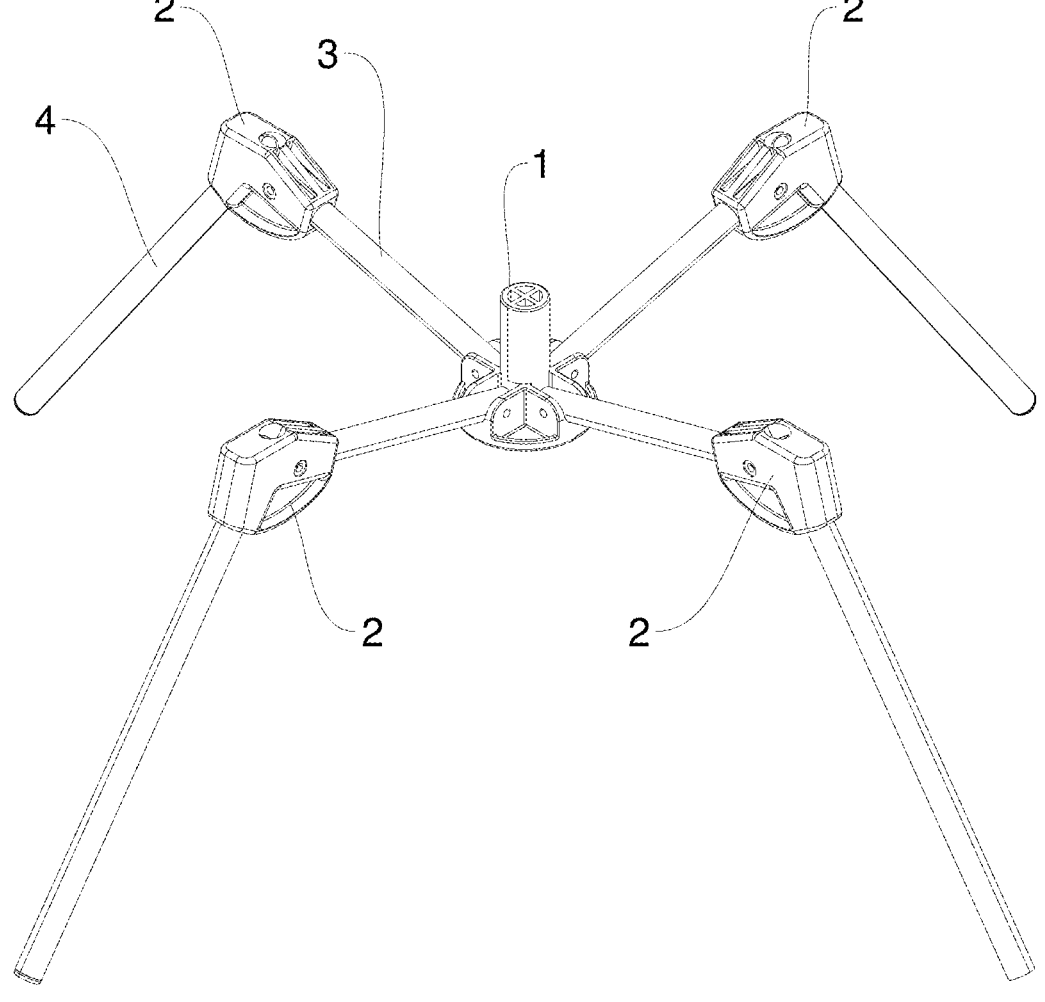
FIG. 5 is a diagram showing the extended state of the foldable frame applied in foldable furniture.

When the foldable frame is applied in the foldable furniture including foldable dining table food cover or foldable mosquito net, etc., as shown in FIG. 5, the foldable frame is placed with the first end surface 11 facing upward in use, and the above-mentioned foldable furniture is placed with the free ends of the second connection rods 4 or the free ends of the third connection rods 5 as support points, and then a cloth is put above or under the first connection seat 1 and the first connection rods 3.

The present disclosure proposes implementations in which the number of the free ends of the second connection rods 4 may be increased while the number of the second connection seats 2 remains unchanged.

Figure 6:
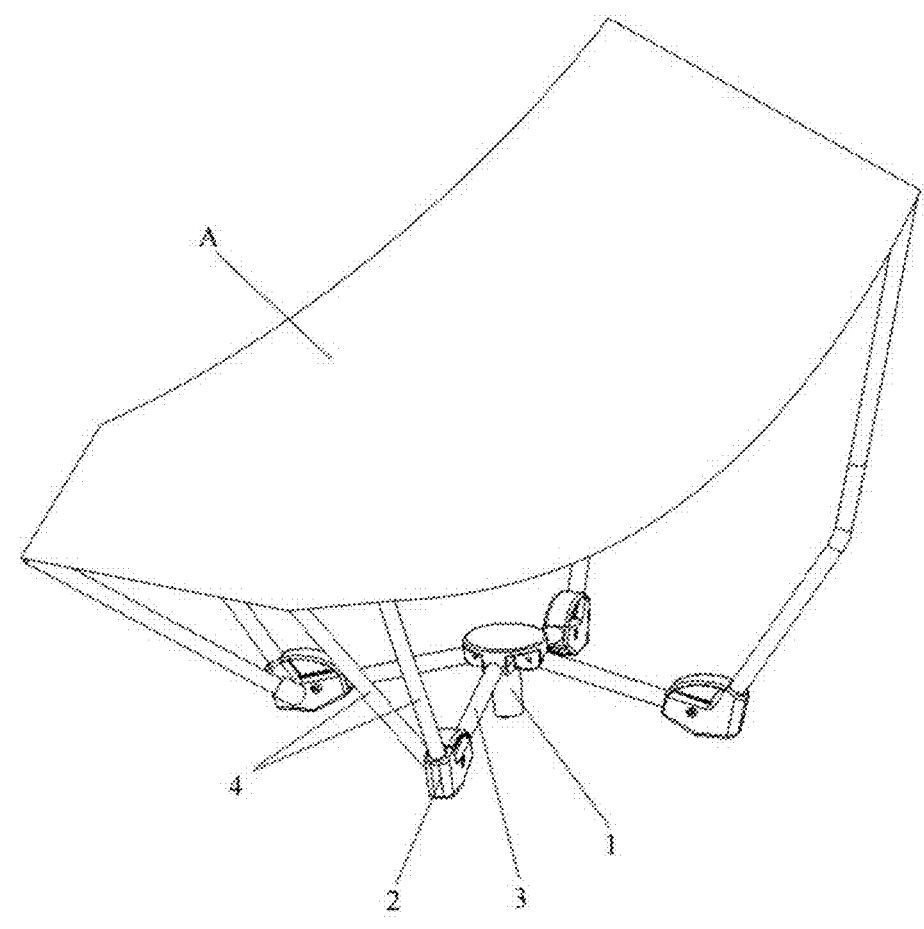
FIG. 6 is a schematic diagram showing the foldable frame of the present disclosure applied in a foldable reclining chair.

One implementation of the present disclosure is as follows: as shown in FIG. 6, the second connection seat 2 is provided with holes oriented in a V pattern, so that two second connection rods 4 can be connected to the second connection seat 2 at the same time, and the two second connection rods are not in parallel with each other, but intersect with each other in an optimized V-shaped arrangement. This arrangement not only effectively disperses the pressure of the fabric or plate on the connection point, but also enhances the stability and torsion resistance of the connection owing to the structural characteristics of the V pattern. Therefore, this embodiment allows to remain the number of second connection seats 2 unchanged while not increasing the number of the second connection seats 2 and the first connection rods 3, and the free ends of the second connection rods 4 are increased without increasing the manufacturing cost of the foldable frame.

Another implementation is as follows: the free ends of the second connection rods 4 are two legs of a V-shaped pattern, by setting the free ends as the legs of the V-shaped pattern, additional support points and connection surfaces can be provided for the fabric or plate, thereby effectively dispersing the pressure of the fabric or plate on the connection point. Therefore, this embodiment allows to remain the number of second connection seats 2 unchanged while not increasing the number of the second connection seats 2 and the first connection rods 3, and the free ends of the second connection rods 4 are increased without increasing the manufacturing cost of the foldable frame.

When the foldable frame is applied in the foldable furniture including a foldable chair, a foldable bed or a foldable table, the increase of the number of free ends of the second connection rods 4 can increase the connection points between the cloth or the plate and the foldable frame, thereby effectively dispersing the pressure of the cloth or the plate on the connection points, further enhancing the connection stability between the cloth or the plate and the foldable frame, and improving the overall user experience and durability.

When the foldable frame is applied in the foldable furniture including a foldable dining table food cover or a foldable mosquito net, the increase of the number of free ends of the second connection rods 4 can provide the foldable frame with more support points against the ground. The design of dispersing the supporting pressure effectively reduces the risk of local overload, significantly enhances the stability and can meet the diversity requirements of the foldable furniture in various occasions in use, and avoids deformation problems caused by long-term use or bearing heavy objects or external pressure.

Figure 7:
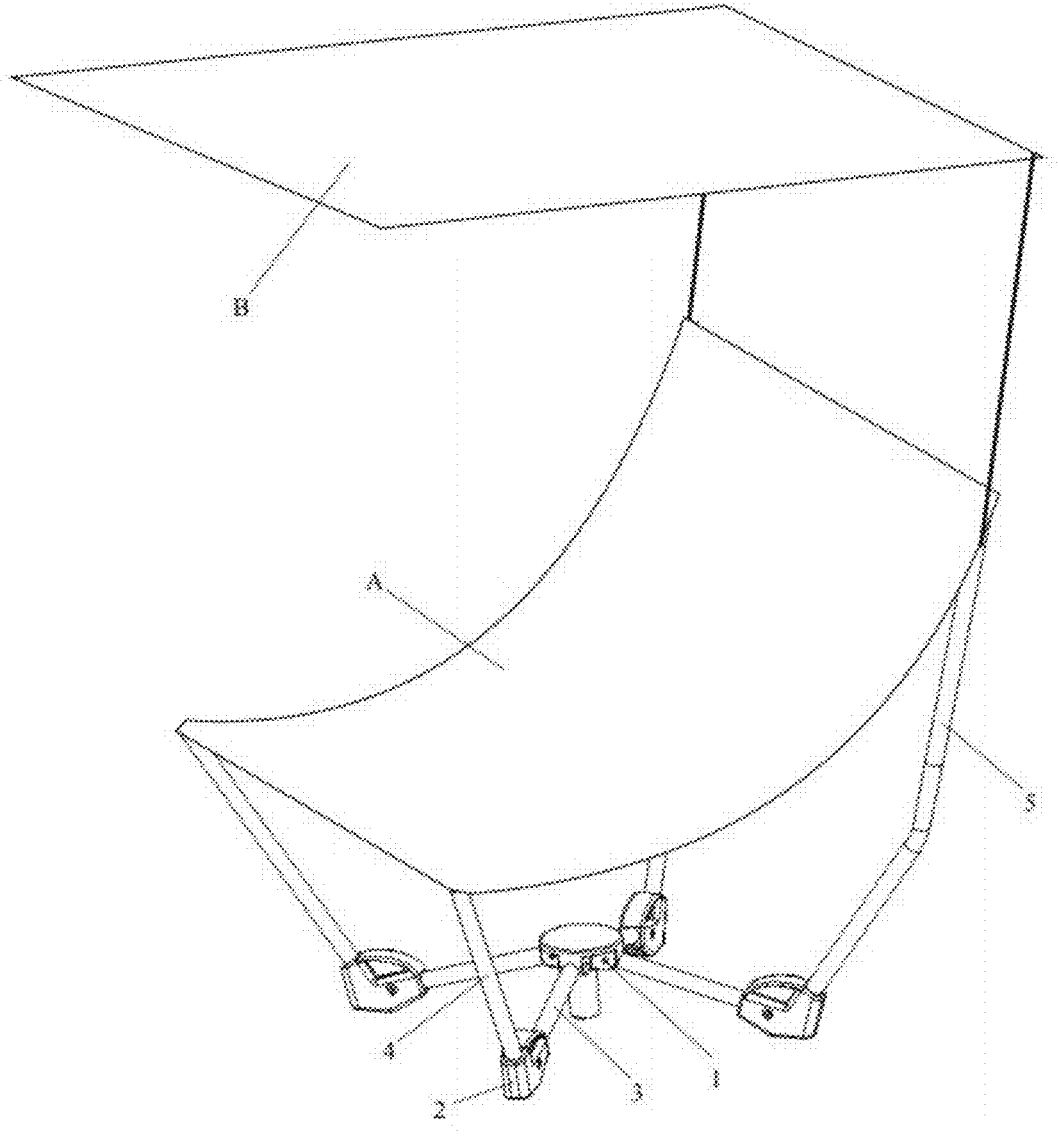
FIG. 7 is a schematic diagram showing the foldable frame of the present disclosure applied in a foldable sunshade chair.

When the foldable frame is applied in foldable furniture, i.e. a foldable chair, as shown in FIGS. 6-7, the free ends of at least two second connection rods 4 are each provided with a third connection rod 5, and the part of the fabric that is connected to the third connection rods 5 may be used as a backrest for the human body, thereby improving the comfort of use.

The second connection rod 4 and the third connection rod 5 may be connected to each other by the following means: specifically, the second connection rod 4 and the third connection rod 5 may be connected to each other by integral molding, welding, gluing, plugging, or the like.

Figure 13:
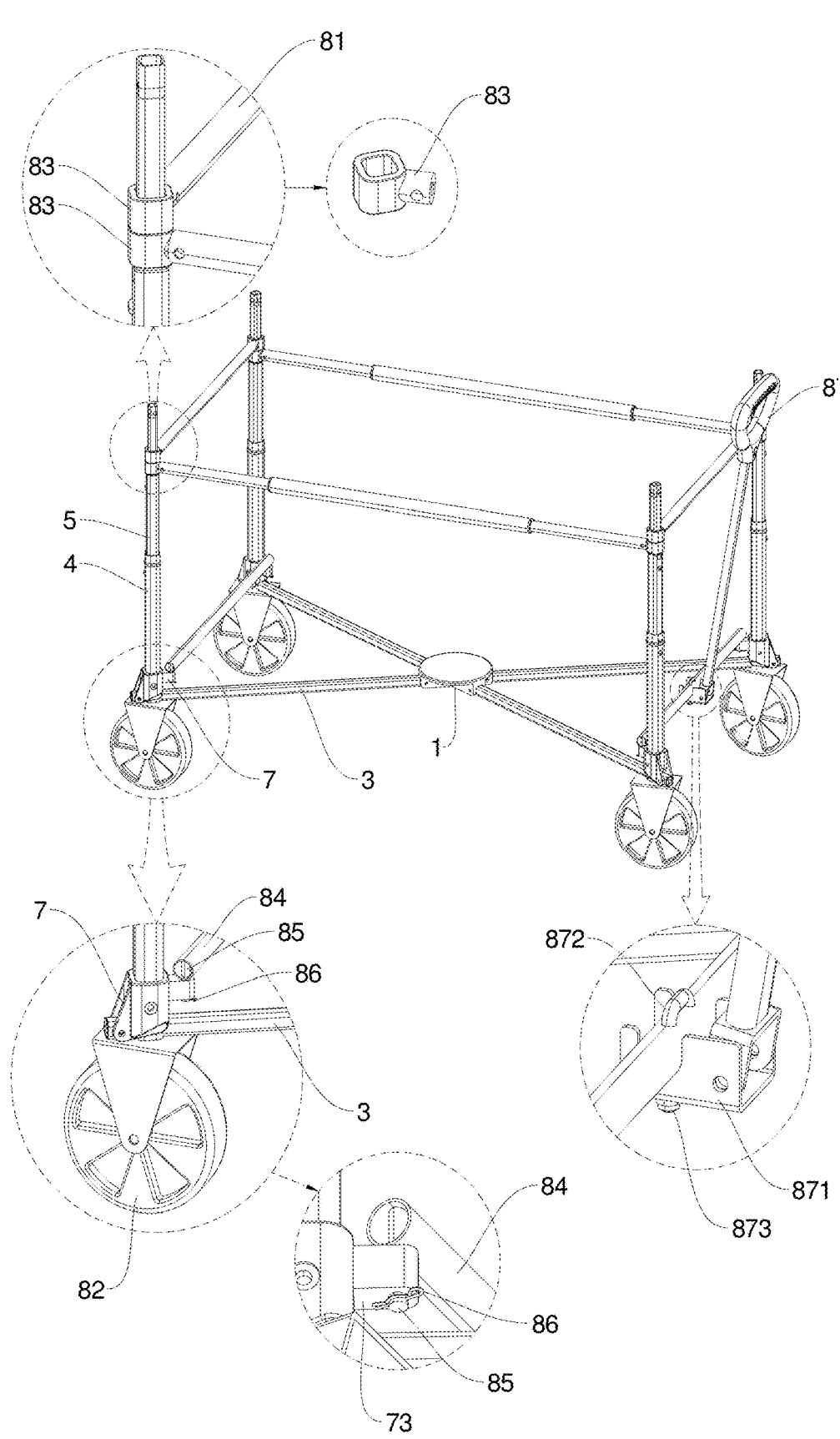
FIG. 13 is a schematic diagram showing the foldable frame of the present disclosure applied in a foldable wagon.
Figure 14:
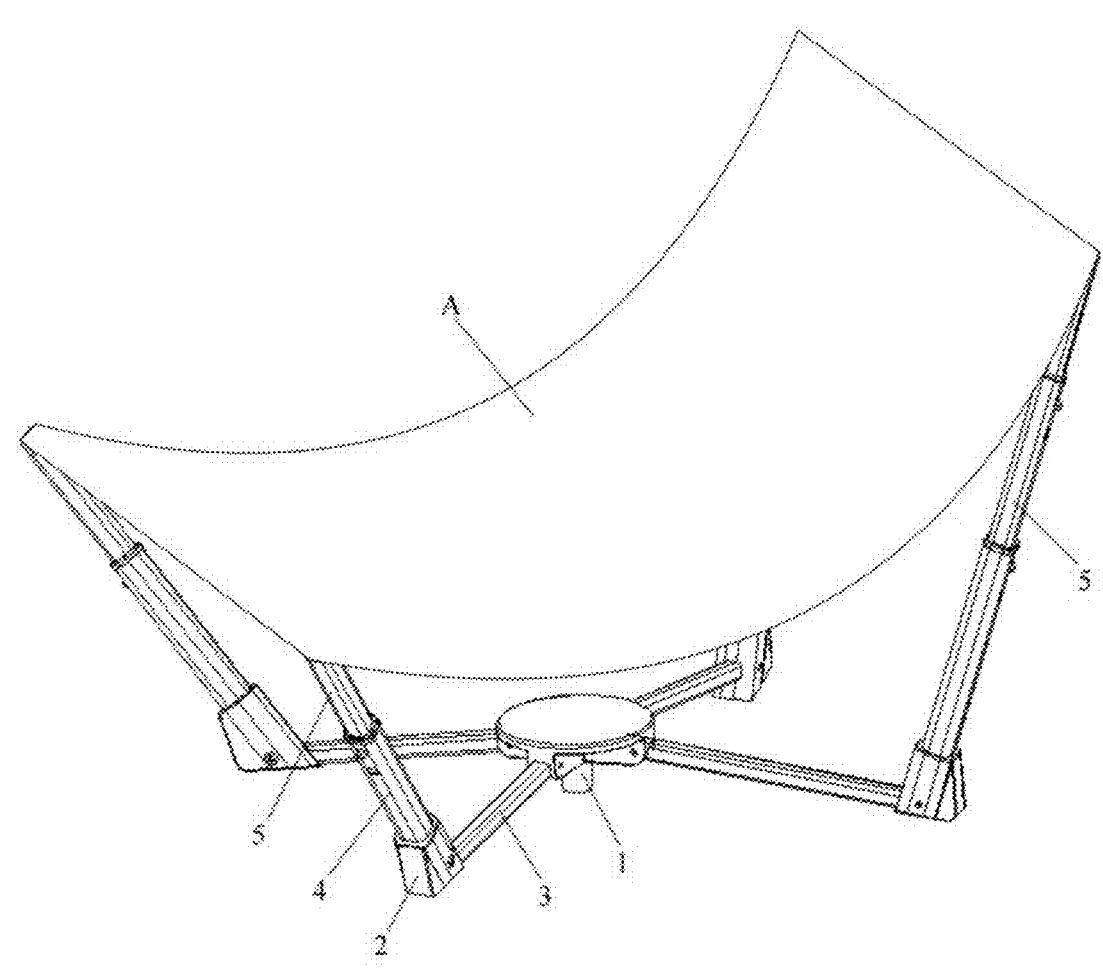
FIG. 14 is a schematic diagram showing the foldable frame of the present disclosure applied in a foldable chair.
Figure 15:
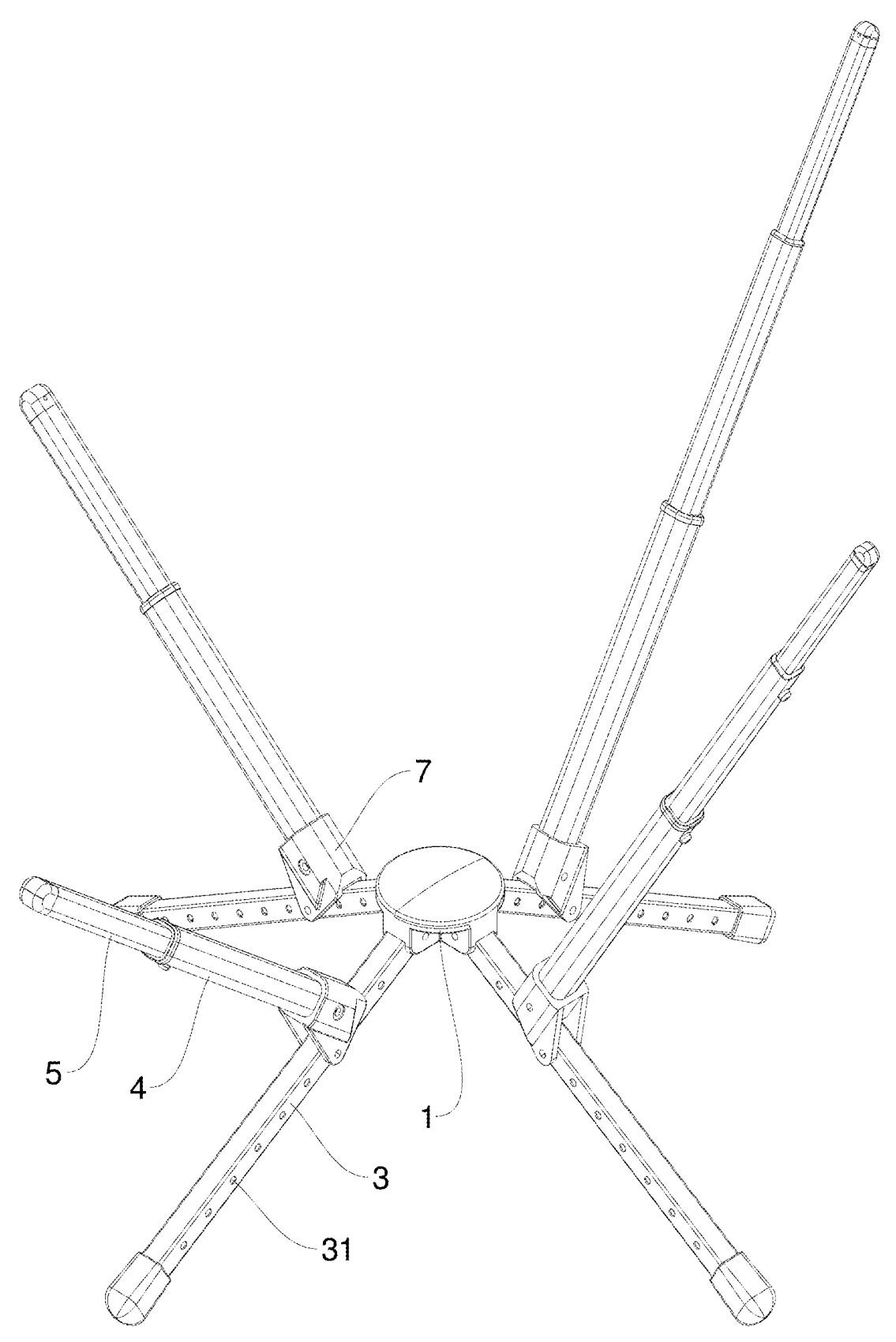
FIG. 15 is a perspective view of a foldable frame according to the second embodiment of the present disclosure.
Figure 16:
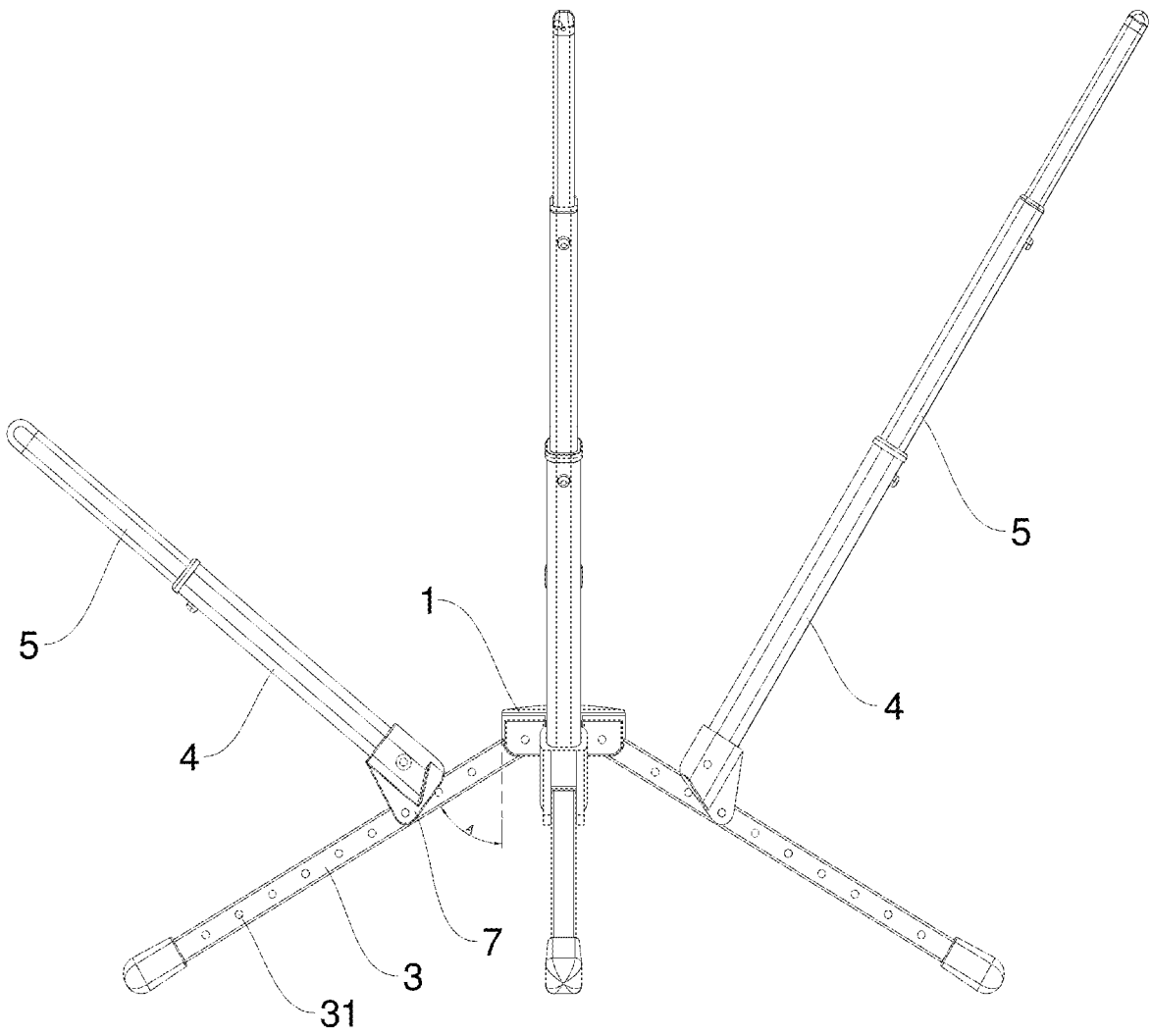
FIG. 16 is a side view of the foldable frame according to the second embodiment of the present disclosure.

Referring to FIGS. 13-15, the first connection rod 3, the second connection rod 4, and the third connection rod 5 may all have a telescopic structure which is realized by nesting an inner tube and an outer tube and by configuring an elastic pin and a plurality of holes that are arranged linearly. With the telescopic structure of the first connection rod 3, the overall size of the foldable frame in the folded state can be reduced and the telescopic structure of the second connection rod 4 and the third connection rod 5 can realize the height adjustment of the foldable furniture, thereby improving the convenience of use and make it adaptable to various occasions. As a further improvement, in other implementations, the second connection seat 2 may be a movable structure that can move along the first connection rod 3, so as to facilitate adjustment.

In addition, the lengths of the first connection rods 3 may be different according to the requirement of different foldable furniture, namely, the lengths of the first connection rods 3 may be set to be equal or unequal.

In addition, it is optional to provide one or two second connection rods 4 on part of the second connection seats 2. For example, the foldable frame of the foldable furniture is provided with eight second connection seats 2 to perform as supporting points against the ground, and among the eight second connection seats 2, four second connection seats 2 are connected with the second connection rods 4, then the above-mentioned fabrics or plates are connected to the four second connection rods 4.

Two ends of the first connection rod 3 are rotatably or pluggably connected to the first connection seat 1 and the second connection seat 2. The specific rotatable or pluggable structure is discussed below.

According to an optional implementation of the present disclosure, the first connection rods 3 are rotatably connected to the first connection seat 1. Specifically, referring to FIG. 2 and FIG. 3, the first connection seat 1 is provided with a first support surface 12, and two side plates 13 spaced apart and arranged on two sides of the first support surface 12, the first connection rod 3 is rotatably connected between the two side plates 13, the first support surface 12 is configured to support the first connection rod 3 biased against the first support surface to put the first connection rod 3 in an unfolded/extended state. When the foldable frame is in the unfolded state, the first support surface 12 can provide the first connection rod 3 with supporting force at a certain degree.

In some implementations, the first connection seat 1 is provided with a hole for inserting the first connection rod 3, and the first connection rod 3 is inserted into the hole by plugging and locked by means of snaps or screws. As an extension, internal threads may be provided on the inner circumference of the hole, and the first connection rod 3 is threadedly connected with the internal threads of the hole, so that the first connection rod 3 is stably connected to the first connection seat 1. Further, since the first support surface 12 is arranged between the hole (rotation axis) for insertion of the first connection rod 3 and the second end surface 21 (support point), compared with the configuration that the first support surface 12 is located at a side of the rotation axis that is away from the support point, the implementation of the present disclosure can greatly reduce the moment of force and improve the overall strength.

Similarly, the first connection rod 3 may be pluggably or rotatably connected to the second connection seat 2 through the same structure described above. An end of the second connection rod 4 may be pluggably or rotatably connected to the second connection seat 2 through the same structure described above.

When the second connection rod 4 and the second connection seat 2 are connected in a pluggable manner, an elastic string 6 is also provided, the elastic string 6 passes through the second connection rod 4 and the second connection seat 2, and the two ends of the elastic string 6 are respectively fixed to the second connection rod 4 and the second connection seat 2. Therefore, even if the user pulls the second connection rod 4 out of the second connection seat 2 to separate the second connection rod 4 with the second connection seat 2, the elastic string 6 can remain the connection therebetween, so as to prevent the second connection rod 4 from being completely detached inadvertently, thereby effectively avoiding the problem of component loss that may occur during the storage or transportation of the foldable furniture.

As shown in FIG. 2, when the foldable frame is in the unfolded/extended state, preferably, the second end surface 21 of the second connection seat 2 is a surface parallel to the horizontal plane, thereby increasing the contact area between the foldable frame and the ground, making the foldable frame more stably supported by the second connection seat 2, and preventing the foldable frame from shaking during use.

Figure 4:
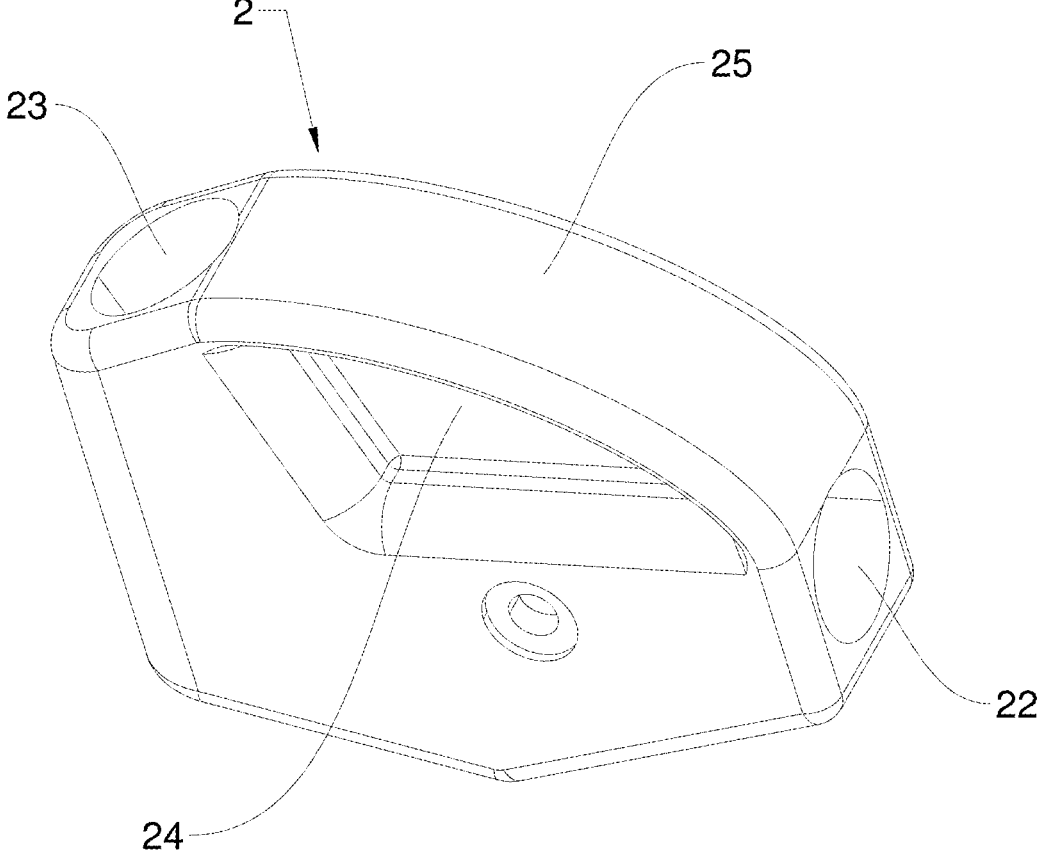
FIG. 4 is a perspective view of a second connection seat according to the first embodiment of the present disclosure.

As shown in FIG. 4, two ends of the second connection seat 2 are respectively provided with a first hole 22 and a second hole 23 for inserting the first connection rod 3 and the second connection rod 4, and a reinforcing rib 24 for connecting the first hole 22 and the second hole 23 is provided. An arc-shaped connecting plate 25 is further provided on the reinforcing rib 24, thereby ensuring the strength of the second connection seat 2 and preventing the second connection seat 2 from deforming during use.

Referring to FIG. 2, the included angle A between the first connection seat 1 and the first connection rod 3 may be set according to different applications, so as to more effectively dispersing the gravity of the user sitting on the foldable frame, thereby improving the overall load-bearing capacity and stability of the foldable frame.

As shown in FIG. 14, when the foldable frame of the present disclosure is applied in a foldable chair, letter A in the figure represents the fabric used, the fabric may be a canvas or other fabric that can bear the weight of a human body. The fabric may be connected to the second connection rod 4 and the third connection rod 5 by binding with straps or the like. By adding the third connection rod 5, the fabric connected to the third connection rod 5 can be used as a backrest for the human body, thereby improving the comfort of use.

Referring to FIG. 6, when the foldable frame of the present disclosure is applied in a foldable reclining chair including a fabric A, the fabric A may be a canvas or other fabric that can bear the weight of a human body. The fabric A may be connected to the second connection rod 4 and the third connection rod 5 by means of binding with straps or the like. By adding the third connection rod 5, the fabric A connected to the third connection rod 5 can be used as a backrest for the human body, thereby improving the comfort of use.

As shown in FIG. 7, when the foldable frame of the present disclosure is applied in a foldable sunshade chair including a fabric A, the fabric A may be a canvas or other fabric that can bear the weight of a human body. The fabric A may be connected to the second connection rod 4 and the third connection rod 5 by means of binding with straps or the like. By adding the third connection rod 5, the fabric A connected to the third connection rod 5 can be used as a backrest for the human body, thereby improving the comfort of use. The foldable sunshade chair may also include a sunshade part B connected to the top of the third connection rod 5, thereby forming a foldable sunshade chair.

Figure 8:
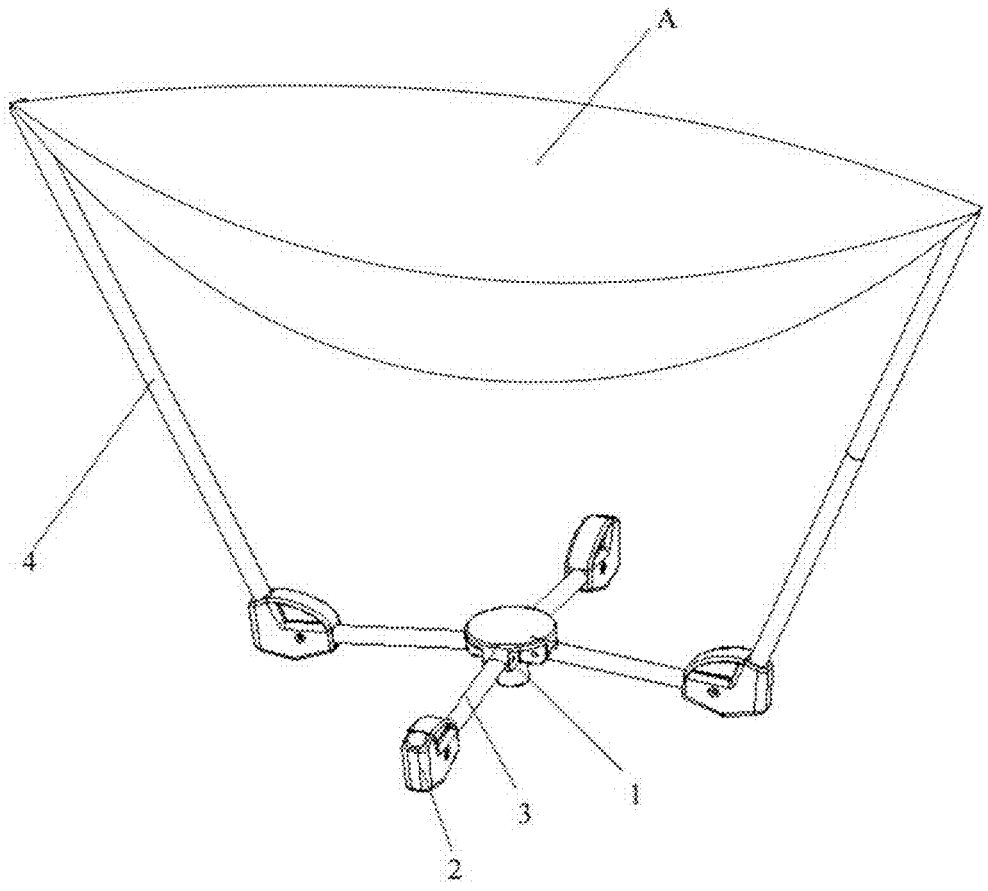
FIG. 8 is a schematic diagram showing the foldable frame of the present disclosure applied in a foldable hammock or a foldable suspended cradle.

As shown in FIG. 8, when the foldable frame of the present disclosure is applied in a foldable hammock or a foldable suspended cradle, more than three second connection seats 2 are configured to support the frame against the ground. Letter A in the figure represents the fabric used, and the fabric is connected by symmetrically arranged second connection rods 4 to form a foldable suspended cradle.

Figure 9:
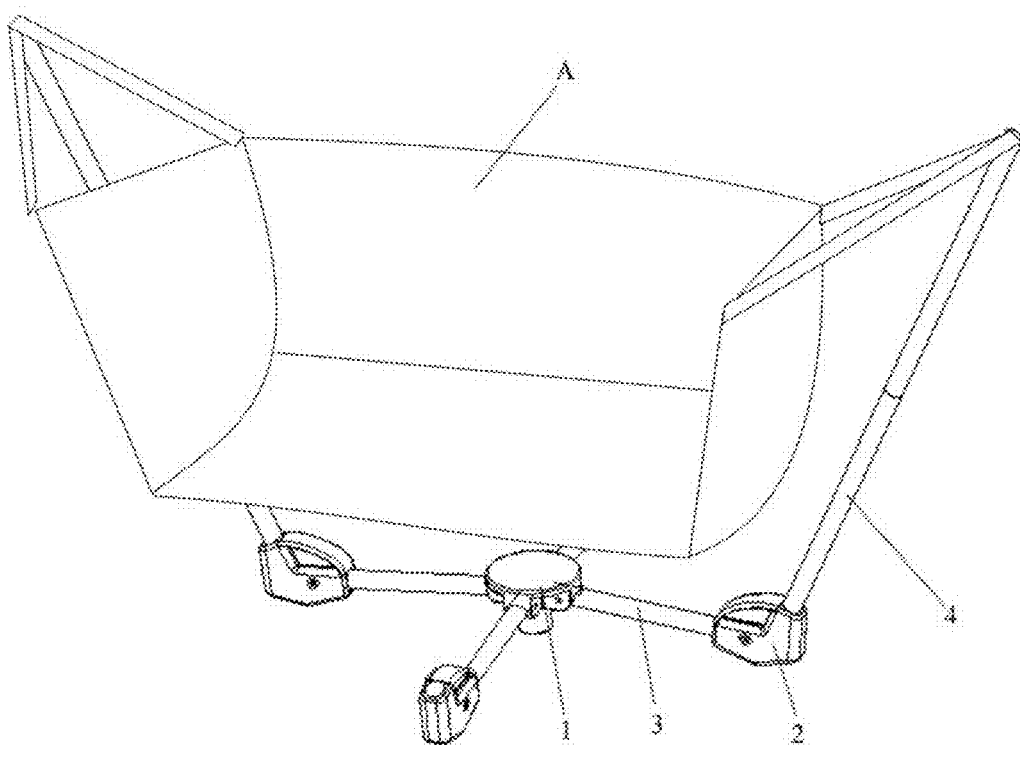
FIG. 9 is a schematic diagram showing the foldable frame of the present disclosure applied in a foldable swing chair.

As shown in FIG. 9, when the foldable frame of the present disclosure is applied in a foldable swing chair, more than three second connection seats 2 are configured to support the frame against the ground. Letter A in the figure represents the fabric used, and the fabric is connected by symmetrically arranged second connection rods 4 to form a foldable swing chair.

Figure 10:
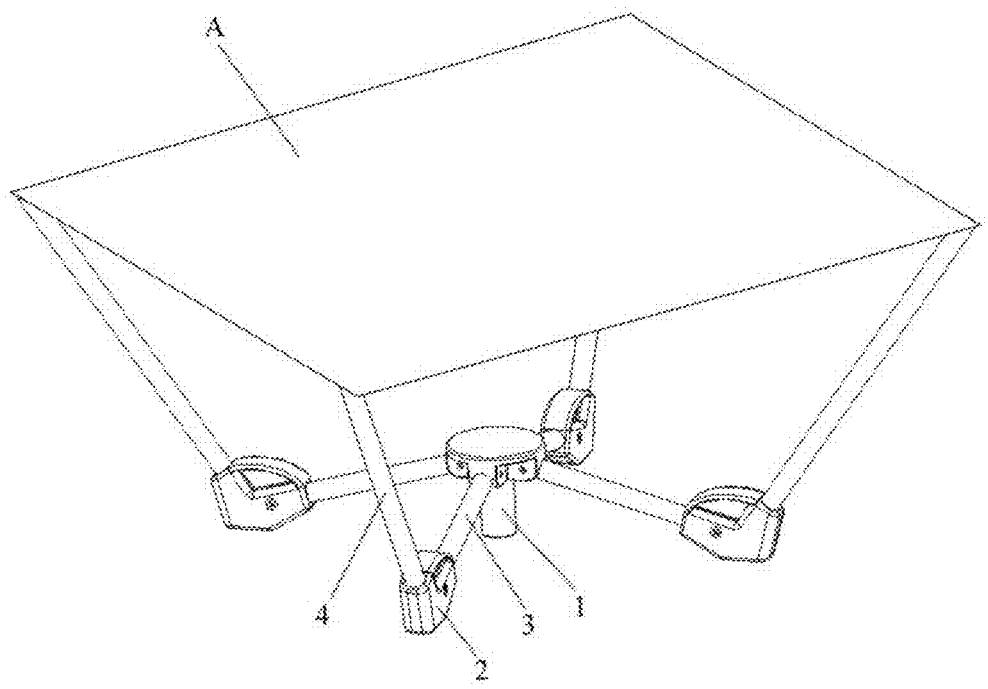
FIG. 10 is a schematic diagram showing the foldable frame of the present disclosure applied in a foldable table.

As shown in FIG. 10, when the foldable frame of the present disclosure is applied in a foldable table, letter A in the figure represents the table top used, and the table top may be a wooden board, a plastic board, an iron board, etc. The table top and the foldable frame may be detachably connected, and the table top may be provided with sleeve tubes for the insertion of the free ends of the second connection rods 4.

Figure 11:
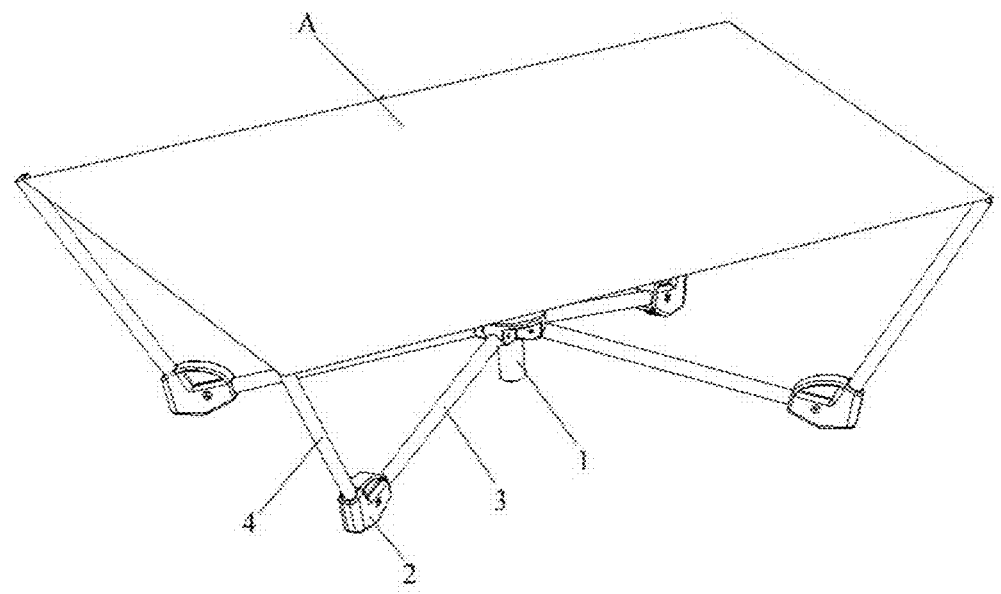
FIG. 11 is a schematic diagram showing the foldable frame of the present disclosure applied in a foldable bed.

As shown in FIG. 11, when the foldable frame of the present disclosure is applied in a foldable bed, letter A in the figure represents the bed board used, and the bed board may be made of cloth or wood board, plastic board, iron board or cardboard. When the bed board is made of cardboard, it may be detachably connected to the foldable frame, and the bed board may be provided with sleeve tubes for insertion of the free ends of the second connection rods 4.

Figure 12:
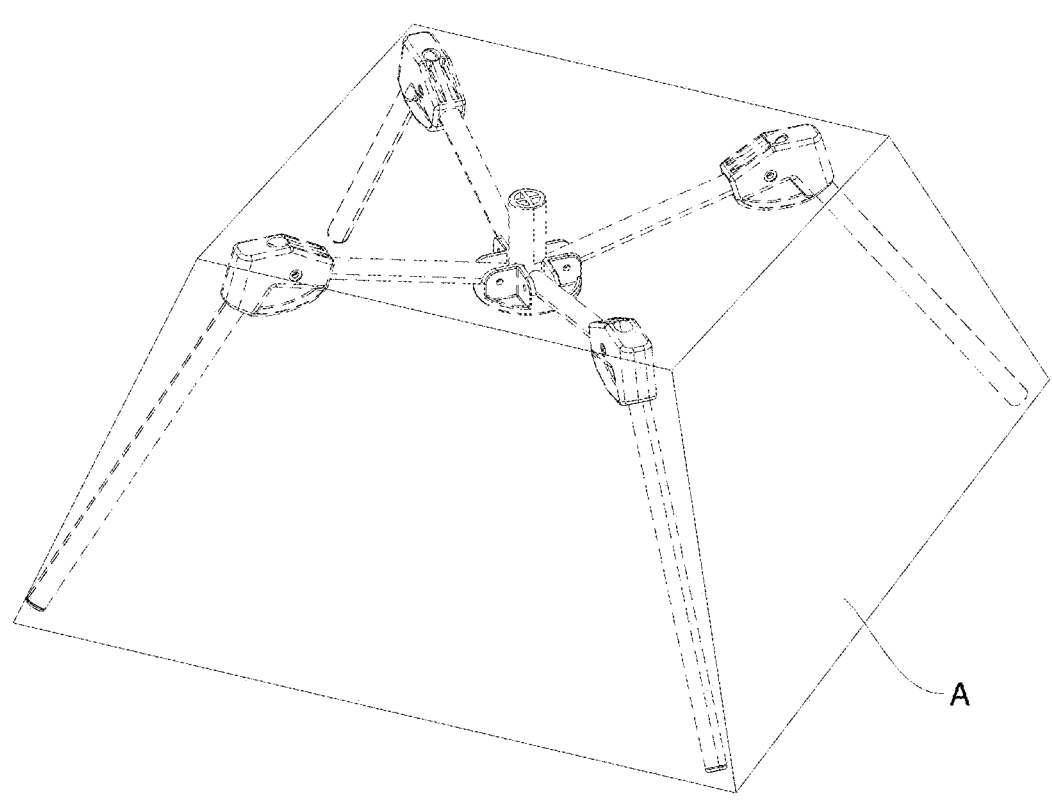
FIG. 12 is a schematic diagram showing the foldable frame of the present disclosure applied in a dining table food cover or a foldable mosquito net.

As shown in FIG. 12, when the foldable frame of the present disclosure is applied in a dining table food cover or a foldable mosquito net commonly used in home, letter A in the figure represents the fabric used, and the fabric may be connected to the second connection rod 4 by means of binding with straps, etc., thereby forming a dining table food cover or a foldable mosquito net.

Figure 17:
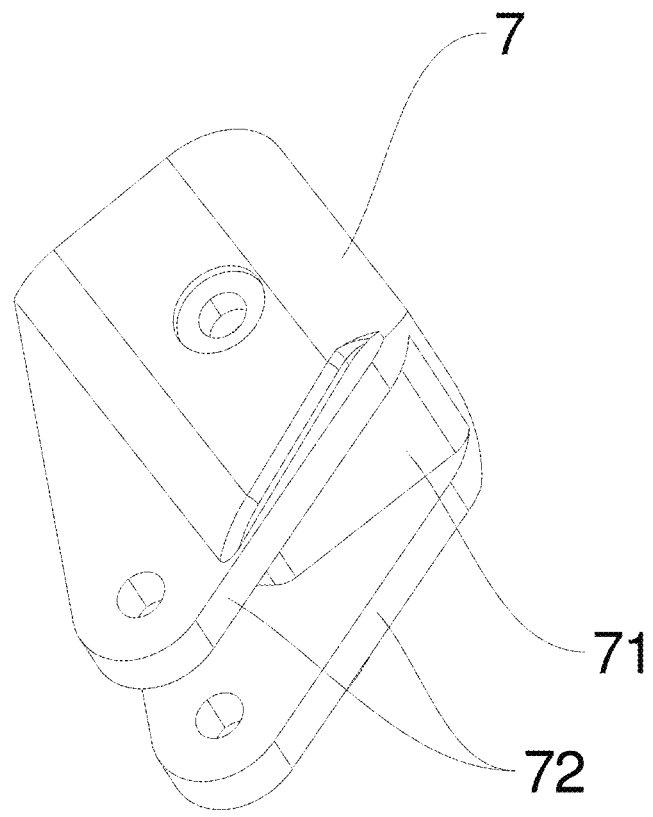
FIG. 17 is a perspective view of a third connection seat according to the second embodiment of the present disclosure.

Referring to FIG. 13 and FIG. 17, as a variation of the second connection seat 2, the second connection seat 2 in the above implementations is replaced with third connection seat 7.

As shown in FIG. 13, the foldable frame of the present disclosure may be used to make a foldable wagon. In this embodiment, the first connection rods 3 are arranged horizontally and the second connection rods 4 are arranged vertically. Wheels 82 are arranged below the second connection rods 4 and the wheels 82 are respectively connected to the first connection rods 3 by a detachable inserted-connected structure. Fourth connection rods 81 for connecting the second connection rods 4 are further provided. The second connection rods are respectively connected to the fourth connection rods 81 through coupling connectors 83, the fourth connection rods 81 each has a telescoping structure, so as to feature the foldable property of the foldable wagon. According to the present embodiment, the third connection seat 7 is provided with an extension portion 73, and a fifth connection rod 84 is arranged on an upper surface of the extension portion 73. The configuration of the fifth connection rod 84 can make the entire foldable frame more stable. A first locking pin 85 is sequentially inserted into the extension portion 73 and the fifth connection rod 84 from bottom to top, and a snap fastener 86 is connected to a lower part of the first locking pin 85 by snap fit to realize quick detachment and attachment structure of the fifth connection rod 84. One of the fifth connection rods 84 is provided with a handle 8, the handle 8 includes a support plate 871 located below the fifth connection rod 84 and a U-shaped member 872 inserted into the fifth connection rod 84 from top to bottom. The U-shaped member 872 is locked and attached with the support plate 871, and the U-shaped member 872 is fastened by a nut to realize fixation of the handle 8.

Referring to FIG. 14, when the foldable frame of the present disclosure is used to make a foldable chair, the third connection seats 7 are rotatably arranged at the terminal of the free ends of the first connection rods 3.

According to another aspect, referring to FIG. 14-FIG. 17, the second embodiment of the foldable frame is shown. The foldable frame includes a first connection seat 1 and at least three third connection seats 7. The third connection seats 7 are arranged around the outer side of the first connection seat 1 at intervals. The first connection seat 1 and the third connection seats 7 are connected via the first connection rods 3. The third connection seats 7 are provided with at least one second connection rod 4. The third connection seats 7 may be arranged at different positions along the length directions of the first connection rods 3 and the third connection seats 7 are rotatably connected with the first connection rods 3. When the third connection seat 7 is in extended state, the third support surface 71 of the third connection seat 7 abuts against/is biased against the first connection rod 3.

When in use, the edge of the cloth of the foldable furniture is fixedly connected to the free ends of the second connection rods 4, the middle portion of the cloth undergoes pressure load such as gravity of human body, and the third support surface 71 keeps contact/connection with the first connection rod 3, so that the foldable frame is unfolded. Meanwhile, the position where the third connection seat 7 is fixed on the first connection rod 3 may be adjusted to adjust the stretch degree of the cloth, so as to adjust the degree that the cloth deforms downward, such that the user can adjust the degree that the cloth can deform to obtain better experience and make the furniture more comfortable. When the foldable frame is folded up for storage, the second connection rods 4 rotate toward the first connection rods 3 via the third connection seats 7 until they are collapsed to get close to each other for storage. Before the rotation, the third connection seat may be moved upward along the first connection rod 3 beforehand to avoid the cloth become taut which may hinder the rotation of the second connection rod 4, thus the foldable frame can be collapsed without disassembling the cloth.

The first connection rod 3 is provided with a plurality of adjustment holes 31 along the length direction of the first connection rod 3, and the third connection 7 is provided with a rotation pin inserted through the adjustment hole 31. With the arrangement of the adjustment holes 31 and the rotation pin, the third connection seat 7 can be set at different positions along the length direction of the first connection rod 3.

Figure 18:
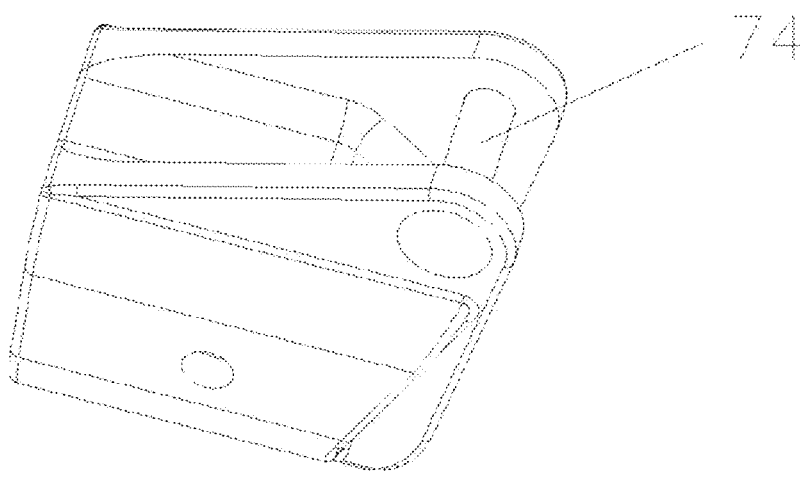
FIG. 18 is another perspective view of the third connection seat according to the second embodiment of the present disclosure.

Referring to FIG. 17 and FIG. 18, the third connection seat 7 includes two side sheets 72 arranged at two sides of the third support surface 71, and a rotation pin 74 is connected to the side sheets 72. In one implementation, the rotation pin 74 may be a telescoping pin, and the specific structure of the telescoping pin is known in the art. With the deformation of the telescoping pin, the telescoping pin can be inserted into desired adjustment hole 31. In another implementation, the rotation pin 74 may be a bolt and a nut that work together, the bolt is inserted into the adjustment hole 31 then connected with the nut to realize positioning of the third connect seat 7.

Similarly, the third connection seat 7 may have the same structure as the second connection seat 2, and the third connection seat 7 may be provided with a V-shaped hole for connecting two second connection rods 4 at the same time.

In the description of the present disclosure, it should be understood that the terms "center", "longitudinal", "lateral", "length", "width", "thickness", "up", "down", "front", "back", "left", "right", "vertical", "horizontal", "top", "bottom", "inside/inner", "outside/outer", "clockwise", "counterclockwise", "axial", "radial", "circumferential" and the like indicate orientations or positional relationships based on the orientations or positional relationships shown in the accompanying drawings, and are only for facilitating description of the present disclosure and simplifying the description, and they are not intended to indicate or imply that the referred device or element must have a specific orientation, be constructed and operated in a specific orientation, and therefore should not be understood as a limitation on the present disclosure.

In the description of the present disclosure, the terms "first" and "second" are used for descriptive purposes only and cannot be understood as indicating or implying relative importance or implicitly indicating the number of the indicated technical features. Therefore, the features defined as "first" and "second" may explicitly or implicitly include one or more of the features.

The above description merely includes the preferred implementation of the present disclosure, and is not intended to limit the disclosure. For those skilled in the art, the disclosure may have various modifications and changes. Any modification, equivalent replacement, improvement, etc. made within the spirit and principle of the disclosure shall be included in the protection scope of the disclosure.

What is claimed is:

1. A foldable frame, wherein the foldable frame is switchable between an extended state and a folded state, comprising:
   a first connection seat and at least three third connection seats, the third connection seats are arranged around an outer side of the first connection seat at intervals, the first connection seat and the third connection seats are connected through first connection rods, and the third connection seats are provided with at least one second connection rod;
   the third connection seats are arranged at different positions along length directions of the first connection rods, and the third connection seats are rotatably connected to the first connection rods, when the third connection seats are in extended state, a third support surface of each third connection seat is biased against the first connection rod.

2. The foldable frame according to claim 1, wherein the first connection rod is provided with a plurality of adjustment holes along a length direction of the first connection rod, each third connection seat is provided with a rotation pin for inserting into adjustment holes on the first connection rods, with a corporation of the adjustment holes and the rotation pins, the third connection seats can be set at different positions along the length directions of the first connection rods.

3. The foldable frame according to claim 2, wherein each third connection seat comprises a rotation pin and two side sheets, the side sheets are arranged at two sides of the third support surface and the rotation pin is arranged on the side sheets.

4. The foldable frame according to claim 3, wherein the rotation pin is a telescoping pin.

5. The foldable frame according to claim 1, wherein the first connection rods are arranged horizontally, and the second connection rod is arranged vertically, wheels are provided below the second connection rod, and a fourth connection rod is provided and connected to the second connection rod.

6. The foldable frame according to claim 1, wherein the first connection rods are rotatably or pluggably connected to the first connection seat respectively.

7. The foldable frame according to claim 1, wherein
   the first connection seat is provided with a first support surface and side plates spaced apart and arranged on two sides of the first support surface, the first connection rod is rotatably connected between the two side plates, and the first support surface is configured to support the first connection rod biased against the first support surface to put the first connection rod in an extended state.

8. The foldable frame according to claim 1, wherein each third connection seat is connected with two second connection rods, and the two second connection rods are arranged in a V shape.

9. The foldable frame according to claim 1, wherein the two second connection rods each have a free end, and the free ends are two legs of a V shape.

10. The foldable frame according to claim 1, wherein the free ends of at least two second connection rods are each provided with a third connection rod.

\* \* \* \* \*